(12) United States Patent  (10) Patent No.:  US 8,284,997 B2
Ibrahim et al.  (45) Date of Patent:  Oct. 9, 2012

(54) VISION-BASED VEHICLE NAVIGATION SYSTEM AND METHOD

(75) Inventors: Mohammed Ibrahim, Bangalore (IN); Dinesh Ramegowda, Mysore (IN); Peter J. Seiler, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 833 days.

(21) Appl. No.: 12/402,279

(22) Filed: Mar. 11, 2009

(65) Prior Publication Data

US 2010/0232639 A1   Sep. 16, 2010

(51) Int. Cl.
G06K 9/00 (2006.01)
(52) U.S. Cl. ........................................................ 382/106
(58) Field of Classification Search .......... 382/100–107, 382/154; 348/114–117; 701/26–29; 180/166–169
See application file for complete search history.

(56) References Cited

U.S. PATENT DOCUMENTS

| | | | |
|---|---|---|---|
| 3,643,213 A | 2/1972 | Yurasek et al. | |
| 4,819,169 A * | 4/1989 | Saitoh et al. | 701/28 |
| 5,343,395 A | 8/1994 | Watts | |
| 6,100,964 A | 8/2000 | De Cremiers | |
| 6,157,876 A | 12/2000 | Tarleton, Jr. et al. | |
| 6,285,393 B1 | 9/2001 | Shimoura et al. | |
| 6,862,519 B2 | 3/2005 | Walter | |
| 6,952,632 B2 | 10/2005 | Robert et al. | |
| 7,109,889 B2 | 9/2006 | He | |
| 7,463,954 B1 | 12/2008 | He | |
| 2003/0103650 A1 | 6/2003 | Otsuka et al. | |
| 2004/0006412 A1 | 1/2004 | Doose et al. | |
| 2004/0080449 A1 | 4/2004 | Horibe | |
| 2005/0196034 A1* | 9/2005 | Hattori et al. | 382/154 |
| 2007/0225895 A1* | 9/2007 | Ma et al. | 701/117 |
| 2007/0241936 A1 | 10/2007 | Arthur et al. | |
| 2008/0042880 A1 | 2/2008 | Ramaiah et al. | |
| 2008/0191903 A1 | 8/2008 | Dubourg et al. | |
| 2008/0211692 A1 | 9/2008 | Fetzmann et al. | |
| 2010/0080467 A1 | 4/2010 | Sakurai | |

OTHER PUBLICATIONS

EP Search Report, EP 10153551.6-2220 dated Jul. 13, 2010.
EP Communication, EP 10153551.6-2220 dated May 26, 2011.

* cited by examiner

*Primary Examiner* — Atiba O Fitzpatrick
(74) *Attorney, Agent, or Firm* — Ingrassia Fisher & Lorenz, P.C.

(57) ABSTRACT

A system and method of determining aircraft position on an aerodrome ground surface having a centerline disposed thereon is provided. A current image of the aerodrome ground surface is captured using a camera that has a known focal length and is disposed on a vehicle at a preset pitch angle. The current image includes the centerline, which extends to a vanishing point in the captured image. The slope and intercept of at least a portion of the centerline are computed. The vertical and horizontal positions of the vanishing point are computed. An estimate of the vehicle position on the ground surface is computed using the computed horizontal and vertical positions of the vanishing point, the known focal length, and the preset pitch angle.

25 Claims, 5 Drawing Sheets

FIG. 6B

VISION-BASED VEHICLE NAVIGATION SYSTEM AND METHOD

TECHNICAL FIELD

The present invention generally relates to vehicle navigation, and more particularly to a system and method for enhancing vision-based vehicle navigation especially, though not exclusively, for aircraft ground operations.

BACKGROUND

The aerospace industry has experienced several technological advances in computing power and techniques, in positioning and surveillance (e.g., Global Positioning System, GPS; ADS-B), and in avionics capabilities (e.g., head-up displays, HUDs; and, electronic moving maps, EMMs). Despite these advances, some aircraft operations continue to be conducted relatively inefficiently.

One of the most inefficient operations is aircraft surface operation. The major reason for this is that aircraft surface operation procedures today are generally the same as they were in the early 1940's, during the beginning years of commercial passenger travel. Admittedly, these traditional procedures do work well in most cases. That is, when the airport surfaces are not congested and visibility is good. However, aircraft traffic volume has increased significantly over the years. As such, it has become increasingly desirable to develop technologies that could improve aircraft surface operations even under poor visibility conditions.

One of the more recent technological developments is a system that generates and renders an airport surface map on a flight deck display upon aircraft touchdown. In some embodiments, the airport map is rendered as an out-the window view on a normal, clear day, and may additionally include identifiers on aircraft pathways such as runways, taxiways and/or aprons. However, the integrity of these systems may depend largely on the integrity and accuracy of the aircraft global positioning system (GPS), the Inertial Navigation System (INS), and/or the geographic feature databases. Insufficient integrity or accuracy from one or more of these navigation aids may cause inaccuracies in the rendered airport map.

One other technological advancement that has been looked to for potentially increasing aircraft ground surface operation efficiency is in the area of enhanced vision systems (EVS). This is because a certified EVS provides navigation cues to pilots during approach and landing irrespective of weather condition. For ground surface operations, navigation guidance information extracted from on-board sensors would need to be used to supplement synthetic images, and assist the pilot in performing integrity checks during poor, low visibility weather conditions. However, such solutions would rely on the development of robust image processing algorithms to handle relatively poor contrast images and provide accurate navigation cue estimates. This development could be fairly costly and time-consuming.

Hence, there is a need for a system and method of increasing the efficiency of aircraft ground surface operations that does not depend largely upon the integrity or accuracy of navigation aids and/or does not rely on the development of potentially complex, non-real-time image processing algorithms. The present invention addresses at least one or more of these needs.

BRIEF SUMMARY

In one embodiment, and by way of example only, a method of determining aircraft position on an aerodrome ground surface having a centerline disposed thereon includes capturing a current image of the aerodrome ground surface using a camera having a known focal length and being disposed on an aircraft at a preset pitch angle. The current image includes the centerline, which extends to a vanishing point in the captured image. The slope and intercept of at least a portion of the centerline are computed. The vertical and horizontal positions of the vanishing point are computed. An estimate of the aircraft position on the aerodrome ground surface is computed using the computed horizontal and vertical positions of the vanishing point, the known focal length, and the preset pitch angle.

In another exemplary embodiment, a system for estimating aircraft position on an aerodrome ground surface having a centerline disposed thereon includes a camera and a processor. The camera is mounted on an aircraft at a preset pitch angle, has a known focal length, and is operable to capture an image of at least a portion of the aerodrome ground surface that includes the visible centerline. The camera is also operable to supply image data representative of the captured image, in which the visible centerline extends to a vanishing point. The processor is coupled to receive the image data and is operable, upon receipt thereof, to compute (i) the slope and intercept of at least a portion of the centerline, (ii) a vertical position of the vanishing point, (iii) a horizontal position of the vanishing point, and (iv) an estimate of the aircraft position on the aerodrome ground surface from the computed horizontal position of the vanishing point, the known focal length, and the preset pitch angle.

In yet another exemplary embodiment, a method of determining vehicle position on a ground surface having a centerline disposed thereon includes capturing a current image of the ground surface using a camera having a known focal length and being disposed on a vehicle at a preset pitch angle. The current image includes the centerline, which extends to a vanishing point in the captured image. The slope and intercept of at least a portion of the centerline are computed. The vertical and horizontal positions of the vanishing point are computed. An estimate of the vehicle position on the ground surface is computed using the computed horizontal and vertical positions of the vanishing point, the known focal length, and the preset pitch angle.

Other desirable features and characteristics of the present invention will become apparent from the subsequent detailed description and appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although embodiments of the invention are described as preferably being implemented in the context of an aircraft, it will be appreciated that the various embodiments may be implemented in other vehicular environments, including various terrestrial and space vehicles.

Figure 1:
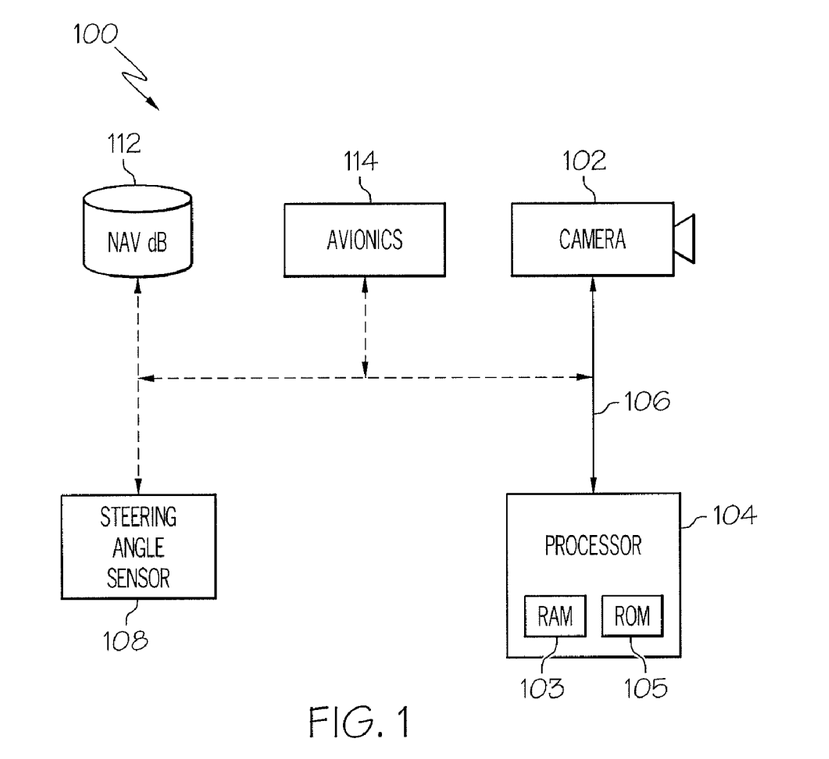
FIG. 1 depicts a functional block diagram of an exemplary vision-based vehicle navigation system.

Turning first to FIG. 1, a functional block diagram of an exemplary vision-based vehicle navigation system is depicted, and includes a camera 102 and a processor 104. The camera 102, as will be described more fully below, is mounted on a vehicle, and is operable to capture images of at least portions of the ground surface on which the vehicle is traveling. The camera 102 may be implemented using any one of numerous suitable image capturing devices now known or developed in the future. In a particular preferred embodiment, however, the camera is implemented using a suitable infrared (IR) camera. Because IR cameras capture images using infrared radiation rather than visible light, an IR camera will capture images regardless of poor visibility due, for example, to poor weather conditions. Regardless of its specific implementation, the camera 102 is also operable to supply image data representative of the captured images to the processor 104.

The processor 104 is in operable communication with the camera 102 via, for example, a suitable communication bus 106. The processor 104 is coupled to receive the image data supplied from the camera 102 and is operable, upon receipt of these data, to compute an estimate of vehicle position. A particular preferred manner in which the processor 104 computes the vehicle position estimate will be described in more detail further below, before doing so however, it is noted that the processor 104 may be implemented using one or more programmable processors or microprocessors, each of which may be any one of numerous known general-purpose microprocessors or application specific processors that operate in response to program instructions.

In the depicted embodiment, the processor 104 includes on-board RAM (random access memory) 103, and on-board ROM (read only memory) 105. The program instructions that control the processor 106 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just one or more programmable processors or microprocessors. For example, digital logic circuits and analog signal processing circuits could also be used.

As FIG. 1 also depicts, the processor 104 may also be in operable communication with one or more other systems, devices, and databases. For example, the processor 104 may additionally be in operable communication with various sensors, such as a steering angle sensor 108, a navigation database 112, and various other avionics systems 114. The purpose for optionally including one or more of these systems, devices, or databases, will be described in more detail further below.

Figure 2:
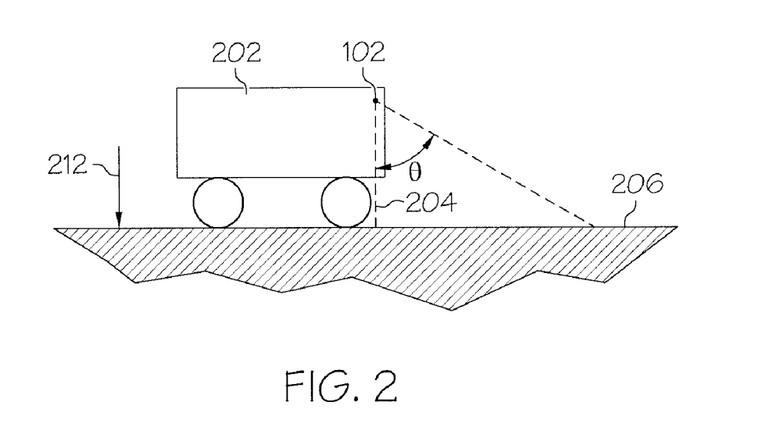
FIGS. 2 and 3 are simplified side and top views, respectively, of a vehicle, depicting how the orientation of a camera mounted on the vehicle may vary.
Figure 3:
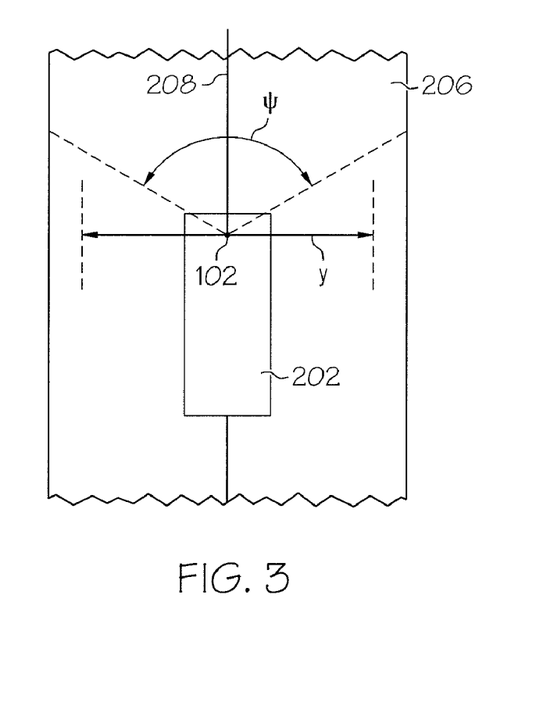

Referring now to FIGS. 2 and 3, it was noted above that the camera 102 is preferably mounted on a vehicle 202. For example, the camera 102 may be mounted on an aircraft 202. No matter the specific vehicle 202 on which the camera 102 is mounted, the camera 102, as depicted most clearly in FIG. 2, is disposed at a fixed, preset pitch angle ($\theta$) relative to a line 204 that is parallel to the ground surface 206 on which the vehicle 202 is located. The preset pitch angle ($\theta$) may vary, but is selected such that the camera 102 captures images of the ground surface that are either immediately in front of the vehicle 202 or sufficiently close to the front of the vehicle 202. Although the camera pitch angle ($\theta$) is fixed, it may be seen in FIG. 3 that the yaw angle ($\psi$) and lateral offset (y) of the camera 102 relative to a centerline 208 disposed on the ground surface 206 may vary. Because the camera 102 is mounted on the vehicle 202, it may thus be appreciated that the camera yaw angle ($\psi$) and lateral offset (y) variations are equivalent to yaw angle ($\psi$) and lateral offset (y) variations of the vehicle 202.

As was previously alluded to, the system 100 is configured to derive the relative orientation (e.g., yaw angle) and position (e.g., lateral offset), and hence the vehicle position on the ground surface 206, from images of the ground surface 206 that are captured by the camera 102. In the preferred embodiment this is accomplished, at least in part, by defining at least two reference frames—a ground surface reference frame and a camera reference frame. Moreover, certain assumptions are also made regarding the ground surface 206. First, it is assumed that the ground surface 206 is flat. It is additionally assumed that the ground surface 206 passes through the origin of the ground surface reference frame, has a visible centerline 208 disposed (e.g., painted) thereon, and is normal to the gravity vector 212 (see FIG. 2) of the vehicle 202. Finally, it is assumed that the width (W) of the ground surface 206 is constant and known. In addition to these assumptions, it is noted that the vehicle 202 may constitute another reference frame of interest. However, as was just noted, the vehicle and camera reference frames are directly related. Thus, while the following descriptions focus on the camera reference frame, it will be understood by the skilled artisan that another transformation may be used to convert the results to the vehicle reference frame. This latter transformation, as may be readily apparent to the skilled artisan, is constant and known.

Figure 4:
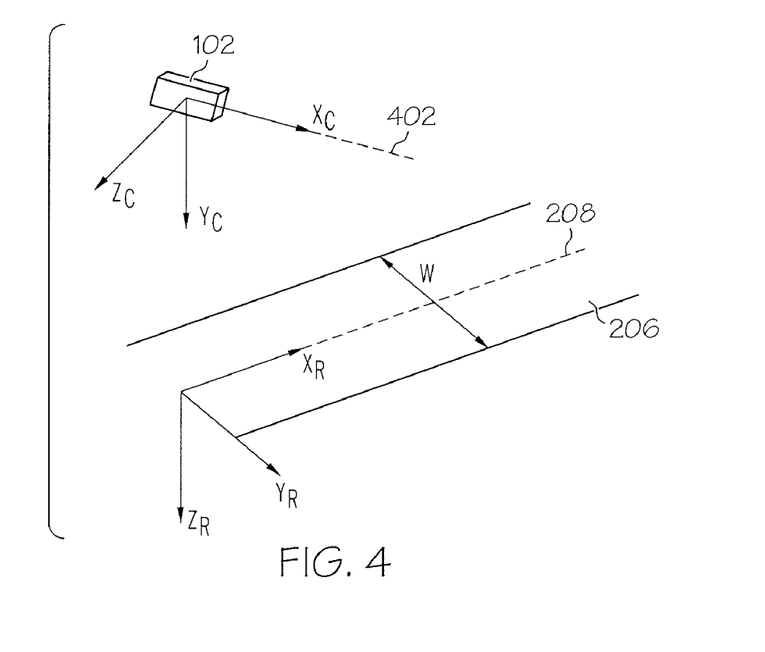
FIG. 4 depicts simplified representations of the ground surface and camera reference frames that are used to implement the present invention.

The ground surface and camera reference frames are both depicted in FIG. 4, and are each implemented using three-dimensional Cartesian coordinate reference frames. As FIG. 4 depicts, the origin of the ground surface reference frame lies on the visible centerline 208. The ground surface reference frame x-axis ($X_R$) is defined as a line that extends from the origin toward the horizon (as viewed by the camera 102), the ground surface reference frame z-axis ($Z_R$) extends downwardly from the origin and is perpendicular to the ground surface 206, and the ground surface reference frame y-axis ($Y_R$) extends from the origin in a direction that is perpendicular to both the x-axis and the z-axis. It may thus be appreciated that the ground surface left edge (LE), right edge (RE), and centerline (CL) may described by the coordinates ($X_{CL}$, 0, 0), ($X_{LE}$, -W/2, 0), Right Edge=($X_{RE}$, W/2, 0).

The camera reference frame x-axis ($X_C$) is defined to coincide with the optical axis 402 of the camera 102. The camera reference frame Y-Z plane, which is defined by the camera reference frame y-axis ($Y_C$) and z-axis ($Z_C$), is parallel to an image plane that is located at $X_C=f$, where f is the negative of the camera focal length.

The transformation from ground surface reference frame coordinates (e.g., $X_R, Y_R, Z_R$) to the camera reference frame coordinates (e.g., $X_C, Y_C, Z_C$) may be expressed as a function of the translation (T) and rotation (RO) of the camera 102, using Equation (1) below:

$$\begin{bmatrix} X_C \\ Y_C \\ Z_C \end{bmatrix} = R_{R \to C} \left( \begin{bmatrix} X_R \\ Y_R \\ Z_R \end{bmatrix} - T_{R \to C} \right),$$

where:
- $T_{R \to C}$ is defined as the origin of the camera reference frame expressed in ground surface reference frame coordinates with a known $Z_R$ component (e.g., $Z_R=-H$, with H being the height of the camera 102 above the ground surface 206);
- $R_{R \to C}$ is defined as the direction cosine matrix, which rotates from the axes of ground surface reference frame to those of the camera reference frame; and
- the Euler angles are defined by yaw ($\psi$) about z-axis, pitch ($\theta$) about the y-axis, and roll ($\phi$) about the x-axis.

In the depicted configurations, as described above, the skilled artisan will appreciate that the pitch ($\theta$) and roll ($\phi$) angles of the camera 102 are fixed and known. As such, $R_{R \to C}$ may be expressed using Equation (2) below:

$$R_{R \to C} = \begin{bmatrix} \cos\theta\cos\psi & \cos\theta\sin\psi & -\sin\theta \\ -\sin\psi & \cos\psi & 0 \\ \sin\theta\cos\psi & \sin\theta\sin\psi & \cos\theta \end{bmatrix}.$$

It may thus be appreciated that a transformation of a three-dimensional position in the camera reference frame to the image plane may be computed from the following Equation (3):

$$\begin{bmatrix} u \\ v \end{bmatrix} = \begin{bmatrix} f & 0 & u_0 \\ 0 & f & v_0 \end{bmatrix} \begin{bmatrix} Y_C/X_C \\ Z_C/X_C \\ 1 \end{bmatrix}$$

where ($u_0, v_0$) are coordinates of center co-ordinates of the image (e.g., $u_0$=image_width/2 and $v_0$=image_height/2).

The reference systems described above are used to derive equations that are used to compute estimates of camera yaw angle and lateral offset with respect to the ground surface centerline 208. The manner in which these equations are derived will now be described.

It is well known that parallel lines in three-dimensional space are not parallel to an image plane, and indeed converge to a vanishing point in the image that defines the image plane. Moreover, the vanishing points of all parallel lines on the ground will fall along a single line, referred to therein as the vanishing line. The vanishing line in an image is just the projection of the horizon or the skyline. The following describes how vanishing point geometry is used to derive analytic solutions for determining the camera yaw angle ($\psi$), assuming the camera pitch angle ($\theta$) and focal length (f) are known.

Initially, it is assumed that P represents a point on the ground surface centerline 208. Moreover, $P_R$ and $P_C$ are vectors to the point (P) expressed in ground surface and camera reference frames, respectively. It will be readily apparent to the skilled artisan that $P_R$ may be expressed as the following Equation (4):

$$p_R = \begin{bmatrix} X_{CL} \\ 0 \\ 0 \end{bmatrix}.$$

As previously mentioned, a point on the ground surface centerline 208 can be expressed in the image reference frame as the following Equation (5):

$$p_C = \begin{bmatrix} \cos\theta\cos\psi & \cos\theta\sin\psi & -\sin\theta \\ -\sin\psi & \cos\psi & 0 \\ \sin\theta\cos\psi & \sin\theta\sin\psi & \cos\theta \end{bmatrix} \left( \begin{bmatrix} X_{CL} \\ 0 \\ 0 \end{bmatrix} - \begin{bmatrix} 0 \\ y \\ -H \end{bmatrix} \right).$$

Upon carrying out the mathematical operations, this expression can be simplified to the following Equation (6):

$$p_C = \begin{bmatrix} X_{CL}\cos\theta\cos\psi - y\cos\theta\sin\psi - H\sin\theta \\ -X_{CL}\sin\psi - y\cos\psi \\ X_{CL}\sin\theta\cos\psi - y\sin\theta\sin\psi + H\cos\theta \end{bmatrix}.$$

As $X_{CL}$ approaches infinity, or in other words, a point on the centerline 208 at the horizon, the above expression can further be simplified as follows by dropping terms not containing $X_{CL}$, since high values of $X_{CL}$ makes some terms insignificant:

$$p_C = \begin{bmatrix} X_{CL}\cos\theta\cos\psi \\ -X_{CL}\sin\psi \\ X_{CL}\sin\theta\cos\psi \end{bmatrix}.$$

It is noted that this simplification is rigorously true only for non-zero coefficients of $X_{CL}$. In particular, if $\psi=0$ then $-X_{CL}\sin\psi - y\cos\psi$ does not converge to $-X_{CL}\sin\psi$. However, the location in the image plane, which is derived below, remains correct even in this case. It may thus be seen that the following Equation (7) results:

$$p_C = \begin{bmatrix} X_C \\ Y_C \\ Z_C \end{bmatrix} = \begin{bmatrix} X_{CL}\cos\theta\cos\psi \\ -X_{CL}\sin\psi \\ X_{CL}\sin\theta\cos\psi \end{bmatrix},$$

from whence it follows that:

$$\frac{Y_C}{X_C} = \frac{-X_{CL}\sin\psi}{X_{CL}\cos\theta\cos\psi} = -\frac{\tan\psi}{\cos\theta}$$

$$\frac{Z_C}{X_C} = \frac{X_{CL}\sin\theta\cos\psi}{X_{CL}\cos\theta\cos\psi} = \tan\theta.$$

Therefore, to obtain the coordinates of the point $X_{CL}$ in the image plane, $(Y_C/X_C)$ and $(Z_C/X_C)$ may be substituted into Equation (3) above, as follows:

$$\begin{bmatrix} u \\ v \end{bmatrix} = \begin{bmatrix} f & 0 & u_0 \\ 0 & f & v_0 \end{bmatrix} \begin{bmatrix} -\dfrac{\tan\psi}{\cos\theta} \\ \tan\theta \\ 1 \end{bmatrix},$$

which simplifies to the following Equation (8):

$$\begin{bmatrix} u \\ v \end{bmatrix} = \begin{bmatrix} u_0 - f\dfrac{\tan\psi}{\cos\theta} \\ v_0 + f\tan\theta \end{bmatrix}.$$

From this expression it is thus seen that the horizontal position of the vanishing point (u) can be used to calculate an estimate of the camera yaw angle ($\psi$), if the focal length (f) and pitch angle ($\theta$) of the camera 102 are known. As previously noted, these latter two parameters are indeed known.

Now, consider a point on the ground surface centerline 208 such that $X_C$ approaches zero. In other words, a point that lies out of the field of view of the image plane. By rewriting Equation (3) above as follows:

$$\frac{u}{v} = \frac{f(Y_C/X_C) + u_0}{f(Z_C/X_C) + v_0} = \frac{fY_C + u_0 X_C}{fZ_C + u_0 X_C},$$

then as $X_C$ approaches zero, this equation simplifies to the following Equation (9), which is the equation for the slope of a line:

$$\frac{u}{v} = \frac{Y_C}{Z_C}.$$

The following equation for $X_C$ can be derived from Equation (6) above:

$$X_C = X_{CL} \cos\theta \cos\psi - y\cos\theta\sin\theta - H\sin\theta.$$

Thus, as $X_C$ approaches zero, the above equation simplifies to:

$$X_{CL} = \frac{(y\cos\theta\sin\psi + H\sin\theta)}{\cos\theta\cos\psi}.$$

If this equation for $X_{CL}$ is substituted into Equation (6), and $X_C$ is assumed to approach zero, the following equation results:

$$P_C = \begin{bmatrix} 0 \\ -\dfrac{(y\cos\theta\sin\psi + H\sin\theta)}{\cos\theta\cos\psi}\sin\psi - y\cos\psi \\ \dfrac{(y\cos\theta\sin\psi + H\sin\theta)}{\cos\theta\cos\psi}\sin\theta\cos\psi - y\sin\theta\sin\psi + H\cos\theta \end{bmatrix}.$$

This equation may be further simplified to:

$$P_C = \begin{bmatrix} X_C \\ Y_C \\ Z_C \end{bmatrix} \begin{bmatrix} 0 \\ -H\tan\theta\tan\psi - (y/\cos\psi) \\ H/\cos\theta \end{bmatrix}.$$

Now, if the expressions for $Y_C$ and $Z_C$ in equation (7) are substituted into the line slope Equation (9) above, this equation becomes:

$$\frac{u}{v} = \frac{Y_C}{Z_C} = \frac{-H\tan\theta\tan\psi - (y/\cos\psi)}{H/\cos\theta},$$

which simplifies to the following Equation (10):

$$\frac{u}{v} = \frac{Y_C}{Z_C} = -\tan\psi\sin\theta - y\left(\frac{\cos\theta}{H\cos\psi}\right).$$

From the above, it will be evident to the skilled artisan that because camera height (H) and camera pitch angle ($\theta$) are fixed and known values, and because an estimate of camera yaw angle ($\psi$) may be calculated from Equation (10) above, if the slope (u/v) of the ground surface centerline 208 is determinable, then an estimate of cameral lateral offset (y) may also be computed. The system 100 described above and depicted in FIG. 1 implements a process that calculates estimates of camera yaw angle ($\psi$) and camera lateral offset (y) relative to the ground surface centerline 208, from whence estimates of vehicle position on the ground surface 206 may be derived. The process implemented by the system 100 is depicted in flowchart form in FIG. 5, and with reference thereto will now be described in more detail. Before doing so, however, it is noted that parenthetical reference numerals in the following descriptions refer to like-numbered flowchart blocks.

Figure 5:
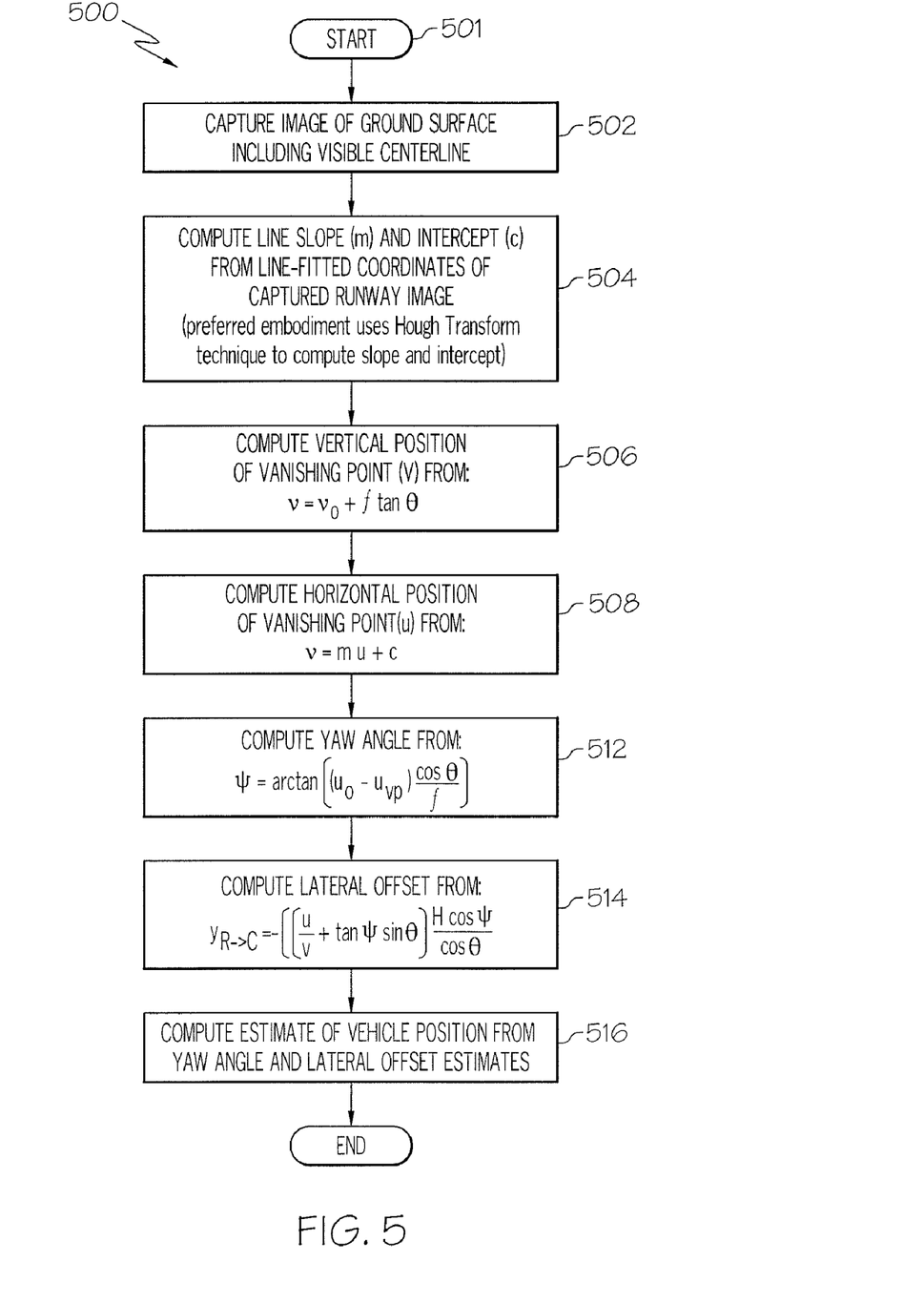
FIG. 5; depicts a process, in flowchart from, that the exemplary system of FIG. 1 may use to calculate estimates of camera position relative to a ground surface centerline, from whence estimates of vehicle position may be derived.

Initially, the system 100, and more specifically the camera 102, captures an image of the ground surface 206 (502). As indicated, the captured image includes the centerline 208 that is disposed on the ground surface 206. It is noted that the system 100 is configured such that the camera 102 will repeatedly capture images of the ground surface 206 at a fairly rapid rate. Moreover, the remaining portions of the process 500 that will now be described are implemented for a single image frame. It may thus be appreciated that the process 500 is conducted on each image frame that is captured by the camera 102.

Though not depicted in FIG. 5, the system 100 is preferably configured to preprocess the captured image. This preprocessing includes selecting only a portion of the captured image, which is referred to herein as a region of interest. The preprocessing also preferably includes suitable noise removal, image smoothing, and edge extraction. The image preprocessing is depicted graphically in FIGS. 6A and 6B, and with reference thereto will now be described. As with the description of the process depicted in FIG. 5, it is noted that parenthetical reference numerals in the following descriptions refer to like-numbered flowchart blocks. It is additionally noted that the non-parenthetical reference numerals refer to like-numbered images in FIGS. 6A and 6B.

Figure 6A:
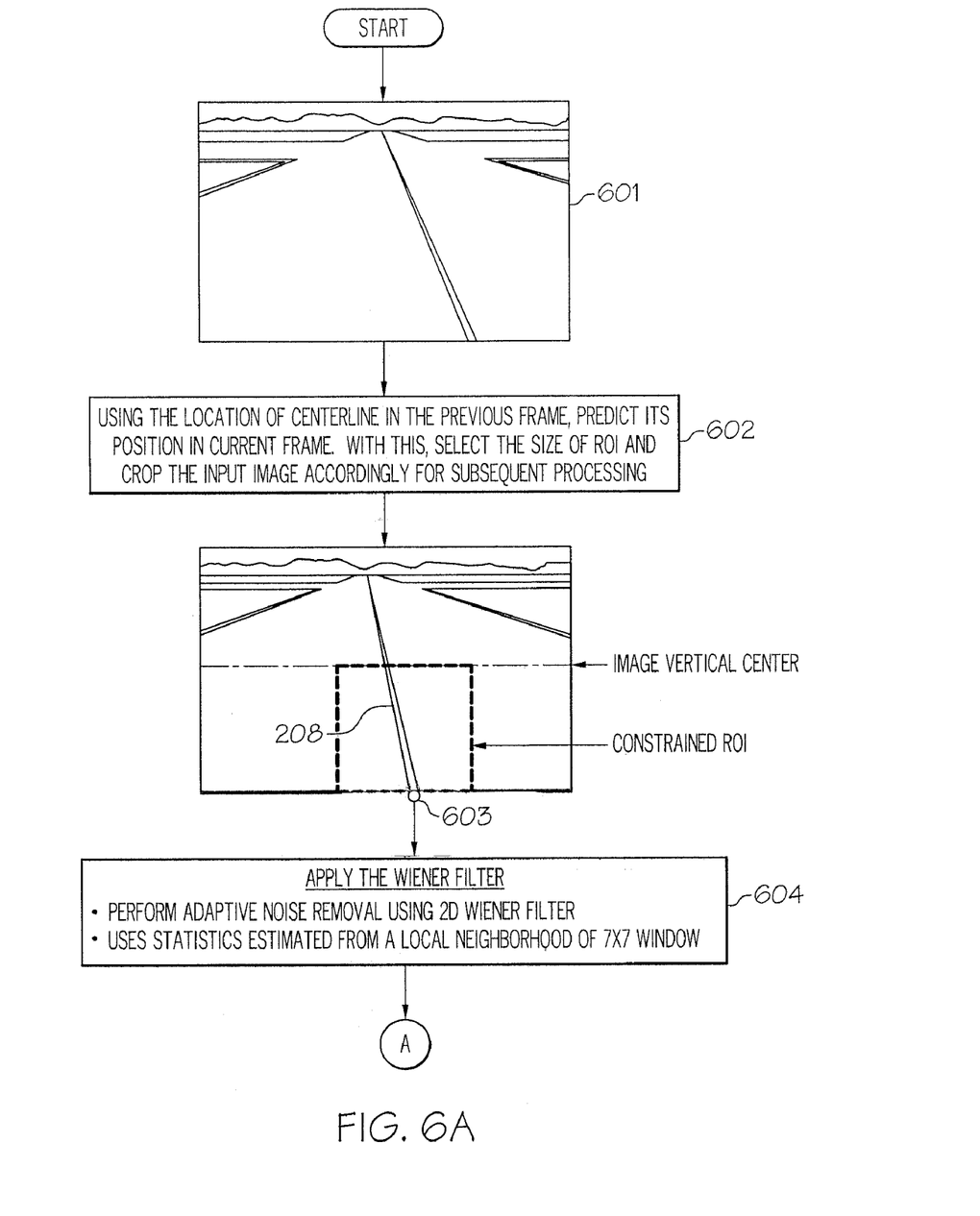
FIGS. 6A and 6B depict a process, in flowchart form, that the exemplary system of FIG. 1 may use to preprocess captured images.

As FIG. 6A depicts, the position of the ground surface centerline 208 in the current image frame 601 is predicted from its location in the previous image frame. The size of the region of interest (ROI) is then selected and the current image frame is cropped (602). It is thus seen that the upper half of the current image 601 is excluded from further processing. This improves efficiency without impacting overall accuracy. One reason for this is because the main objective is to extract local guidance information rather than global information for aircraft maneuvering. As such, processing a section of image reduces computational requirements. In most instances, the upper half of the image is cluttered with background information (horizon, airport structures, and other hot bodies, such as parked aircraft). This background information, when processed, contributes to outliers. Moreover, it was shown above that with a known focal length (f) and camera pitch angle (θ), the vertical position of vanishing point can be computed using Equation (8) above. Hence, it is sufficient if only a single ground surface line is fitted and intersected with the image horizon line. Accordingly, in a preferred embodiment, and as FIG. 6A clearly depicts, the ROI includes only the ground surface centerline 208. The height of the ROI is preferably fixed to one-half the image height (e.g., ImageHeight/2); however, the width of the ROI is determined based on the slope (m) of the fitted centerline 208 from the previous image frame and its horizontal position at v=0, which is indicated in FIG. 6A with reference numeral 603.

The images acquired by the camera 102 may be sufficiently noisy to influence the accuracy of subsequent image processing. Such noise may vary, but typically includes electronic noise, coding noise, and quantization artifacts during digitization. Hence, the ROI is suitably filtered (604). Though various filters that are suitably configured to remove such noise are known, it is preferable to use an edge preserving smoothing filter, which retains image edges while eliminating noise. One such filter is the Wiener filter, which, for completeness, will be briefly described.

As is generally known, a Wiener filter estimates the local mean (μ) and variance (σ) around each pixel as follows:

$$\mu = \frac{1}{NM} \sum_{n_1, n_2 \in \eta} A(n_1, n_2)$$

$$\sigma_S^2 = \frac{1}{NM} \sum_{n_1, n_2 \in \eta} A^2(n_1, n_2) - \mu^2,$$

where η is the N-by-M local neighborhood of each pixel in the image (A). The Wiener filtered image B is given by the expression:

$$B(n_1, n_2) = \mu + \frac{\sigma_S^2 - \sigma_N^2}{\sigma_S^2}(A(n_1, n_2) - \mu),$$

where $\sigma_N^2$ is the noise variance. If the noise variance is not available, the Wiener filter uses the average of all the local estimated variances. In the preferred implementation, the system 100 implements a two-dimensional Weiner filter that uses statistics estimated from a local neighborhood of a 7×7 window to supply a filtered image for subsequent processing.

It is known to the skilled artisan that edge pixels are perceptually brighter than other pixels. Hence, the next image preprocessing step is locating relatively brighter pixels in each horizontal scan line. Initially, a mean suppression and contrast stretching process is implemented (606), thereby generating a gray image. For this, the mean gray value along every horizontal scan line is computed. For each scan line, each pixel intensity is subtracted from the mean gray value. The input gray level is then transformed to the specified output gray level with gamma representing the shape of the transformation curve.

Figure 6B:
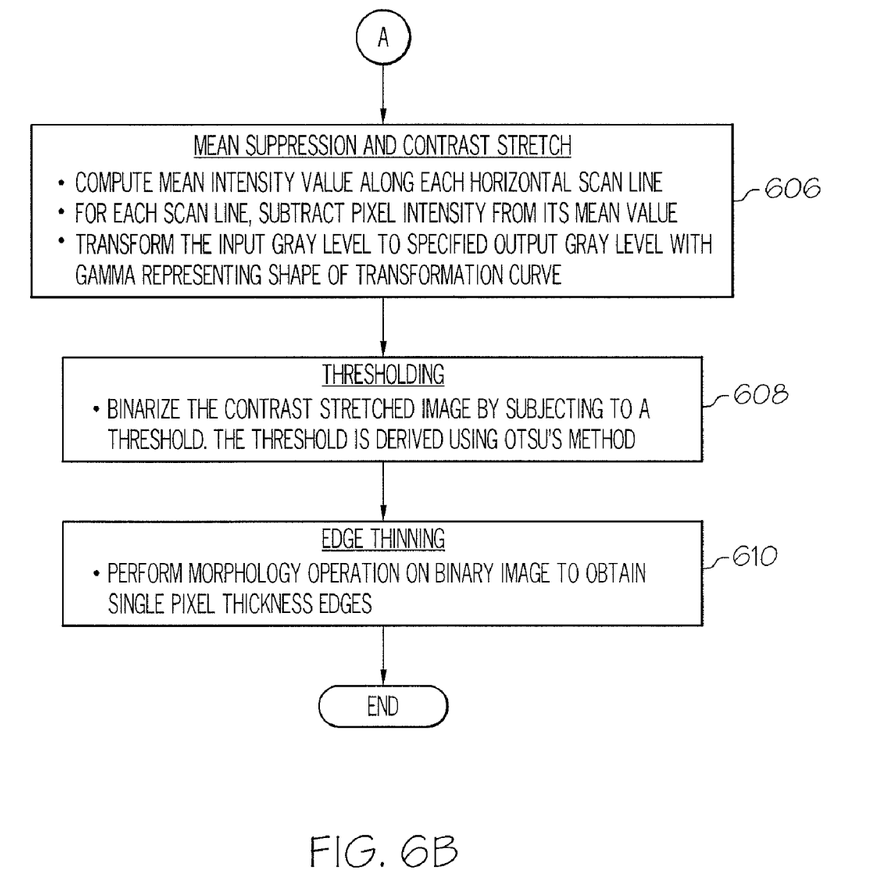

The gray image is converted to a binary image via a thresholding process (608). In the preferred embodiment, the standard Otsu's method is used. The Otsu's method exhaustively searches for the threshold (t) that minimizes intra-class variance, which is defined as a weighted sum of variances of the two classes (namely, background and foreground). More specifically, the Otsu's method uses the following:

$$\sigma_w^2(t) = \omega_1(t)\sigma_1^2(t) + \omega_2(t)\sigma_2^2(t),$$

where $\omega_1$ is the class probability for background pixels and is given by:

$$\omega_1(t) = \sum_{i=1}^{t} P(i),$$

and $\omega_2$ is the class probability for the foreground pixels and is given by:

$$\omega_2(t) = \sum_{i=t+1}^{255} P(i).$$

In addition, $\sigma_1^2$ and $\sigma_2^2$ are individual class variances given by:

$$\sigma_1^2(t) = \sum_{i=1}^{t} [i - \mu_1(t)]^2 \frac{P(i)}{\omega_1(t)}$$

$$\sigma_2^2(t) = \sum_{i=t+1}^{255} [i - \mu_2(t)]^2 \frac{P(i)}{w_2(t)},$$

where $\mu_1(t)$ and $\mu_2(t)$ are mean values of individual classes, and are given by:

$$\mu_1(t) = \sum_{i=1}^{t} \frac{iP(i)}{\omega_1(t)}$$

$$\mu_2(t) = \sum_{i=t+1}^{255} \frac{iP(i)}{\omega_2(t)}.$$

The appropriate threshold value (t) that minimizes $\sigma_w^2(t)$ is iteratively obtained. The threshold (t) is then used to separate foreground pixels (e.g., those with intensities greater than t) from background pixels (e.g., those with intensities less than t).

The binary image then undergoes edge thinning (610). In particular, at least in the depicted embodiment, morphological image open operations are implemented to bring uniformity and reduce speckle noise. Single pixel thickness edges are then generated by scanning each horizontal scan line from left to right) until a foreground pixel is hit. The preprocessed, edge extracted image is then ready for the subsequent processing that is depicted in FIG. 5, and the remainder of which will now be described.

Returning once again to FIG. 5, after an image frame is captured (502) (and preferably preprocessed), the processor 104 implements appropriate software routines to compute the slope (m) and intercept (c) of the centerline 208 in the captured image (504). To implement this portion of the process 500, the edges preferably are first downsampled at two different sampling rates. A relatively high sampling rate (e.g., scanning every line) is used for the bottom half of the edges, and relatively low sampling rate (e.g., scanning only one in four lines) is used for the top half of the edges. This downsampling of the edges reduces the subsequent computation, and eliminates the number of spurious edge pixels that may occur at the top portion of the ROI due to high pixel compression ratio. The processor 104 then implements the standard Hough transform technique to find the line parameters of the extracted ground surface centerline edges. As is generally known, if no prior knowledge is available, the Hough transform sets a range of $[0, \pi]$ range for the parameter ($\theta$), while searching for line in parameter space. However, because prior knowledge is available, the range for ($\theta$) is restricted to $[50°, 130°]$. This prior knowledge comes from the fact that under the ideal scenario, that is with no lateral offset (y) and no heading (e.g., no yaw ($\psi$)) error, the ground surface centerline 208 is perpendicular to the u-axis and passes through point (u/2, v/2). However, under non-zero lateral offset or non-zero yaw conditions, the slope of the ground surface centerline 208 deviates to either side of the perpendicular.

To further reduce the computational intensity of the Hough line fitting technique, the slope of the fitted ground surface centerline 208 is analyzed across a few hundreds of frames. It was found that in doing so the slopes of the ground surface centerline 208 do not significantly change temporally, except when the vehicle undergoes an intentional turn. For example, in the context of an aircraft, when the vehicle transitions from a taxiway to a runway or vice-versa. Hence, in the preferred Hough fitting implementation, the ($\theta$) range for line searching in any frame is determined by following expression:

$$\theta_{current} = \theta_{prev} \pm \Delta\theta.$$

It is noted that the value for $\Delta\theta$ in the above expression is preferably fixed to a predetermined value. Although this value may vary, in a particular preferred embodiment a value of $10°$ is used.

Apart from fixing the range of the $\theta$-parameter, the remaining steps for transforming the sampled edge pixels in (u, v) space to ($\rho,\theta$) space are conducted in accordance with the conventional Hough transform. In particular, for each edge pixel, a value of $\rho$ is computed for each edge pixel using the following polar representation of a line, and for all values of $\theta$:

$$\rho = u\cos(\theta) + v\sin(\theta).$$

The histogram, $H([\rho][\theta])$, is then generated, and the coordinates of the point corresponding to maximum value of the histogram defines the parameters of the required line in ($\rho,\theta$) space. The line parameters ($\rho,\theta$) in the Hough space are then transformed to a set of (u,v) coordinates in the image space.

In a preferred embodiment, a routine to measure the goodness of the line fitting is also implemented. As used herein, the goodness of fitting is defined as the ratio of the number of edge pixels that lie within a defined margin from the fitted line co-ordinates to the total number of edge pixels. The goodness of line fitting measure helps in selecting only the appropriate edge pixels for line fitting. And hence is very useful in selecting the piecewise linear segment of the curved segment that is considered in subsequent processing.

For the selected set of approximate linear edge pixels, a least square line is fitted and the line parameters (slope and intercepts) are computed. Subsequently, these line parameters are used to find the vanishing point. After the slope and intercept of the fitted line have been computed, the vertical position (v) of the ground surface centerline vanishing point is computed using Equation (8) above (506), and the horizontal position (u) of the centerline vanishing point is computed using Equation (9) above (508). The computed horizontal position (u) is then used to compute an estimate of the yaw angle ($\psi$) using Equation (8) above (512), which is then used to compute an estimate of lateral offset (y) using Equation (10) above (514). These computed estimates may then be correlated to vehicle position, by the processor, and then reported, or the computed estimates may be reported to one or more other external systems for correlate the estimates to vehicle position (516).

Before proceeding further, it is noted that, although not depicted in FIG. 5, the computed parameter estimates (e.g., $\psi$ and y) are preferably subjected to set of functional constraints before being reported. In a particular preferred embodiment, the estimates are reported if, and only if, the following functional constraints are satisfied: (1) the image contrast is more than a predetermined value (e.g., [0.05, 0.2]); (2) the number of edge pixels is more than a predetermined value (e.g., 25% of ROI height); and (3) the difference in the estimates between two successive frames is within a predetermined value (e.g., 3-degrees).

Up to this point, the description has centered around the vehicle 202 being on a substantially straight ground surface 206, and hence with a substantially linear centerline 208. Not all ground surfaces are straight. However, due to the rather large radius of curvature of most ground surfaces of interest, there is no need to model the entire ground surface curvature. Rather, it is sufficient to model just the closest segment of the ground surface curvature with respect to which vehicle's current position and orientation will computed. This is due, in part, to the fact that the process proves estimates with respect to the nearest centerline segment, which enables local guidance. Moreover, any small segment on the curvature can be approximated with a linear model (line). Accordingly, in a particular preferred embodiment, the segment corresponding to bottom extreme of the curvature is selected and fitted using a linear model. It should be noted that the extent of curvature at the bottom to be considered for fitting and subsequent parameter estimation needed to be addressed. The proposed solution is that a relatively low, predetermined number of edge scan lines (with number of scan lines fixed arbitrarily) are initially picked and fitted to a line using the Hough method. Then, the goodness of fit, which was described above, is used to determine the extent of curvature. The chosen edges are then refitted with a least squares method to extract line parameters.

From the above, it is readily apparent that the parameter estimation for substantially straight ground surfaces is slightly different from that for curved ground surfaces. Accordingly, a suitable trigger mechanism is implemented to ensure the appropriate software is executed for the appropriate ground surface. This trigger mechanism may be implemented using any one of numerous means and devices. For example, in one embodiment the flight crew may be relied upon to intervene during a transition from/to a straight ground surface to/from a curved ground surface to ensure the appropriate software is executed. In another embodiment, the vehicle steering system may be used to supply an appropriate trigger mechanism. In still another non-limiting embodiment, the trigger mechanism may be supplied from one or more navigation/avionic systems including, for example, the navigation database or the TAAS (Taxiway Awareness and Advisory System) database. Moreover, an EMM and cleared taxi route information could be used to identify the transition from a straight ground surface to a curved ground surface.

In addition to the above, it will be appreciated that the position estimates from on-board sensors may either be used as guidance commands by pilot for surface operation or as means for automatic nose wheel steering augmenting GPS and airport digital map. The estimated location of the runway centerline within the sensor data may also be used to correct the database of airport layout, which is otherwise currently updated manually at less frequency.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining aircraft position on an aerodrome ground surface having a centerline disposed thereon, the method comprising the steps of:
    capturing a current image of the aerodrome ground surface using a camera having a known focal length and being disposed on an aircraft at a preset pitch angle, the image including the centerline, the centerline extending to a vanishing point in the captured image, and at least a portion of the centerline having a slope and an intercept;
    computing the slope and intercept of at least a portion of the centerline;
    computing a vertical position of the vanishing point;
    computing a horizontal position of the vanishing point;
    computing an estimate of the aircraft position on the aerodrome ground surface using the computed horizontal and vertical positions of the vanishing point, the known focal length, and the preset pitch angle.

2. The method of claim 1, wherein the step of computing the estimate of the aircraft position comprises:
    computing an estimate of aircraft yaw angle relative to the centerline; and
    computing an estimate of aircraft lateral offset relative to the centerline.

3. The method of claim 1, further comprising:
    using a location of the centerline from a previously captured image of the aerodrome ground surface to predict a current location of the centerline in the current image.

4. The method of claim 1, further comprising:
    line fitting the centerline using a Hough transform process; and
    the slope and intercept are computed from the line fitted centerline.

5. The method of claim 1, further comprising:
    selecting only a portion of the current image as a region of interest, before computing the slope and intercept of at least a portion of the centerline.

6. The method of claim 5, wherein:
    the current image has a height dimension and a width dimension;
    the region of interest has a height dimension and a width dimension;
    the height dimension of the region of interest corresponds to one-half the height dimension of the current image; and
    the width dimension of the region of interest is determined based in part on the slope of the centerline from a previously captured image of the aerodrome ground surface.

7. The method of claim 1, further comprising:
    preprocessing the current image prior to conducting any of the steps of computing.

8. The method of claim 7, wherein the step of preprocessing the current image comprises filtering at least a portion of the current image to remove noise therefrom.

9. The method of claim 8, wherein the step of filtering at least a portion of the current image comprises performing adaptive noise removal using a two-dimensional Wiener filter.

10. The method of claim 7, wherein the step of preprocessing the current image comprises extracting edges of the current image to obtain single pixel thickness edges.

11. A system for estimating aircraft position on an aerodrome ground surface having a centerline disposed thereon, the system comprising:
    a camera mounted on an aircraft at a preset pitch angle, the camera having a known focal length and operable to capture an image of at least a portion of the aerodrome ground surface including the visible centerline and supply image data representative of the captured image, the visible centerline extending to a vanishing point in the captured image, and at least a portion of the visible centerline in the captured image having a slope and an intercept; and
    a processor coupled to receive the image data and operable, upon receipt thereof, to compute:
        the slope and intercept of at least a portion of the centerline,
        a vertical position of the vanishing point,
        a horizontal position of the vanishing point, and
        an estimate of the aircraft position on the aerodrome ground surface from the computed horizontal position of the vanishing point, the known focal length, and the preset pitch angle.

12. The system of claim 11, wherein the processor is configured to compute the estimate of the aircraft position by:
    computing an estimate of aircraft yaw angle relative to the centerline; and
    computing an estimate of aircraft lateral offset relative to the centerline.

13. The system of claim 11, wherein the processor is further configured to use a location of the centerline from a previously captured image of the aerodrome ground surface to predict a current location of the centerline in the current image.

14. The system of claim 11, wherein:
    the processor is further configured to implement a Hough transform process to line fit the centerline using; and
    the processor computes the slope and intercept from the line fitted centerline.

15. The system of claim 11, wherein the processor is further configured to select only a portion of the current image as a region of interest, before computing the slope and intercept of at least a portion of the centerline.

16. The system of claim 15, wherein:
the current image has a height dimension and a width dimension;
the region of interest has a height dimension and a width dimension;
the height dimension of the region of interest corresponds to one-half the height dimension of the current image; and
the width dimension of the region of interest is determined based in part on the slope of the centerline from a previously captured image of the aerodrome ground surface.

17. The system of claim 11, wherein the processor is further configured to preprocess the current image.

18. The system of claim 17, wherein the processor is configured to filter at least a portion of the current image to remove noise therefrom.

19. The system of claim 18, wherein the processor is configured to implement a two-dimensional Wiener filter.

20. The system of claim 17, wherein the processor is further configured to extract edges of the current image to obtain single pixel thickness edges.

21. A method of determining vehicle position on a ground surface having a centerline disposed thereon, the method comprising the steps of:
capturing a current image of the ground surface using a camera having a known focal length and being disposed on a vehicle at a preset pitch angle, the image including the centerline, the centerline extending to a vanishing point in the captured image, and at least a portion of the centerline having a slope and an intercept;
computing the slope and intercept of at least a portion of the centerline;
computing a vertical position of the vanishing point;
computing a horizontal position of the vanishing point;
computing an estimate of the vehicle position on the ground surface using the computed horizontal and vertical positions of the vanishing point, the known focal length, and the preset pitch angle.

22. The method of claim 21, further comprising:
determining that the ground surface is transitioning from a substantially straight segment to a curved segment.

23. The method of claim 22, further comprising:
sensing a change in vehicle heading; and
determining that the ground surface is transitioning from the substantially straight segment to the curved segment from the sensed change in vehicle heading.

24. The method of claim 22, further comprising:
receiving electronic moving map data and taxi route clearance data; and
determining that the ground surface is transitioning from the substantially straight segment to the curved segment from the received electronic moving map data and the taxi route clearance data.

25. The method of claim 22, further comprising:
receiving ground surface data from a ground surface database; and
determining that the ground surface is transitioning from the substantially straight segment to the curved segment from the received ground surface data.

* * * * *